United States Patent
Mohalik et al.

(10) Patent No.: US 12,323,432 B2
(45) Date of Patent: Jun. 3, 2025

(54) IN A DISTRIBUTED COMPUTING SYSTEM WITH UNTRUSTED ENTITIES METHOD AND APPARATUS FOR ENABLING COORDINATED EXECUTIONS OF ACTIONS

(71) Applicant: Telefonaktiebolaget LM Ericsson (publ), Stockholm (SE)

(72) Inventors: Swarup Kumar Mohalik, Bangalore (IN); Ramamurthy Badrinath, Bangalore (IN); Sandhya Baskaran, Chennai (IN); Perepu Satheesh Kumar, Chennai (IN); Anshu Shukla, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 757 days.

(21) Appl. No.: 17/273,087

(22) PCT Filed: Sep. 14, 2018

(86) PCT No.: PCT/IN2018/050595
§ 371 (c)(1),
(2) Date: Mar. 3, 2021

(87) PCT Pub. No.: WO2020/053872
PCT Pub. Date: Mar. 19, 2020

(65) Prior Publication Data
US 2021/0194890 A1    Jun. 24, 2021

(51) Int. Cl.
*H04L 9/40* (2022.01)
*G06Q 10/08* (2024.01)

(52) U.S. Cl.
CPC ........... *H04L 63/123* (2013.01); *G06Q 10/08* (2013.01)

(58) Field of Classification Search
CPC ...... H04L 63/123; G06Q 10/08; G06F 21/645
See application file for complete search history.

(56) References Cited

U.S. PATENT DOCUMENTS

| 5,329,626 A | 7/1994 | Klein et al. |
| 10,839,386 B2 * | 11/2020 | Kamalsky ............. H04L 9/0637 |

(Continued)

FOREIGN PATENT DOCUMENTS

| CN | 107103054 A | 8/2017 |
| CN | 107832139 A | 3/2018 |

(Continued)

OTHER PUBLICATIONS

Afanasev, Maxim Ya, et al. "An application of blockchain and smart contracts for machine-to-machine communications in cyber-physical production systems." 2018 IEEE Industrial Cyber-Physical Systems (ICPS). IEEE, 2018. (Year: 2018).*

(Continued)

*Primary Examiner* — Jung W Kim
*Assistant Examiner* — Sameera Wickramasuriya
(74) *Attorney, Agent, or Firm* — Weisberg I.P. Law, P.A.

(57) ABSTRACT

A method and a system are presented for enabling coordinated executions of actions in a distributed computing system with untrusted local computing agents. A smart contract including plans is recorded in a blockchain database. Each plan includes actions to be executed by a respective one of the local computing agents. Execution of a first action of a first set of actions to be executed by a first local computing agent is requested. Execution of a second action of a second set of actions to be executed by a second local computing agent is requested. Responsive to determining, based on the smart contract, that the first action can be executed, the first local computing agent is caused to execute the first action and responsive to determining, based on the (Continued)

smart contract, that the second action cannot be executed, the second local computing agent is caused to not execute the second action.

18 Claims, 13 Drawing Sheets

(56) References Cited

U.S. PATENT DOCUMENTS

| | | | |
|---|---|---|---|
| 2017/0011460 A1* | 1/2017 | Molinari | H04L 9/3247 |
| 2017/0140408 A1 | 5/2017 | Wuehler | |
| 2017/0372300 A1* | 12/2017 | Dunlevy | G06Q 20/363 |
| 2018/0094953 A1* | 4/2018 | Colson | G06Q 10/0833 |
| 2019/0205870 A1* | 7/2019 | Kamalsky | G06Q 20/3829 |
| 2019/0362287 A1* | 11/2019 | Achkir | H04L 67/10 |
| 2020/0258061 A1* | 8/2020 | Beadles | H04L 63/102 |
| 2021/0050989 A1* | 2/2021 | Kempf | H04L 9/3236 |

FOREIGN PATENT DOCUMENTS

| | | |
|---|---|---|
| DE | 69131500 T2 | 4/2000 |
| WO | 2018/078584 A1 | 5/2018 |

OTHER PUBLICATIONS

S. Wang, Y. Yuan, X. Wang, J. Li, R. Qin and F.-Y. Wang, "An Overview of Smart Contract: Architecture, Applications, and Future Trends," 2018 IEEE Intelligent Vehicles Symposium (IV), Changshu, China, 2018, pp. 108-113, (Year: 2018).*

Xu, Xiwei, et al. "The blockchain as a software connector." 2016 13th Working IEEE/IFIP Conference on Software Architecture (WICSA). IEEE, 2016. (Year: 2016).*

European Search Report and Search Opinion, EP App. No. 18933148, Sep. 23, 2021, 11 pages.

International Preliminary Report on Patentability, PCT App. No. PCT/IN2018/050595, Mar. 25, 2021, 8 pages.

Frantz et al., "From Institutions to Code: Towards Automated Generation of Smart Contracts", 2016 IEEE 1st International Workshops on Foundations and Applications of Self-Systems, IEEE Computer Society, 2016, pp. 210-215.

International Search Report and Written Opinion, PCT App. No. PCT/IN2018/050595, Dec. 13, 2018, 10 pages.

Office Action, CN App. No. 201880097359.1, Dec. 28, 2023, 06 pages of Original Document only.

Office Action, EP App. No. 18933148, Jul. 14, 2023, 5 pages.

* cited by examiner

DETERMINE, BASED ON THE SMART CONTRACT, WHETHER THE FIRST ACTION CAN BE EXECUTED BY THE FIRST OF THE PLURALITY OF LOCAL COMPUTING AGENTS
425

DETERMINE, BASED ON THE SMART CONTRACT, WHETHER AN ACTION EXPECTED TO BE EXECUTED PRIOR TO THE FIRST ACTION IS INCLUDED IN A SET OF COMPLETED ACTIONS STORED IN THE BLOCKCHAIN DATABASE
426

DETERMINE, BASED ON THE SMART CONTRACT, A FIRST SET OF ONE OR MORE PRECONDITIONS TO BE SATISFIED PRIOR TO THE EXECUTION OF THE FIRST ACTION
427

FIG. 4B

DETERMINE, BASED ON THE SMART CONTRACT, WHETHER THE SECOND ACTION CAN BE EXECUTED BY THE SECOND OF THE PLURALITY OF LOCAL COMPUTING AGENTS
430

DETERMINE, BASED ON THE SMART CONTRACT, WHETHER AN ACTION EXPECTED TO BE EXECUTED PRIOR TO THE SECOND ACTION IS INCLUDED IN A SET OF COMPLETED ACTIONS STORED IN THE BLOCKCHAIN DATABASE
431

DETERMINE, BASED ON THE SMART CONTRACT, A SECOND SET OF ONE OR MORE PRECONDITIONS TO BE SATISFIED PRIOR TO THE EXECUTION OF THE SECOND ACTION
432

FIG. 4C

RESPONSIVE TO DETERMINING THAT THE SECOND ACTION CANNOT BE EXECUTED, CAUSING THE SECOND OF THE PLURALITY OF LOCAL COMPUTING AGENTS TO NOT EXECUTE THE SECOND ACTION 440

WHERE THE FIRST ACTION IS EXPECTED TO BE EXECUTED PRIOR TO THE SECOND ACTION AND DETERMINING THAT THE SECOND ACTION CANNOT BE EXECUTED INCLUDES DETERMINING THAT THE FIRST ACTION IS NOT INCLUDED IN THE SET OF COMPLETED ACTIONS STORED IN THE BLOCKCHAIN DATABASE
441

IN A DISTRIBUTED COMPUTING SYSTEM WITH UNTRUSTED ENTITIES METHOD AND APPARATUS FOR ENABLING COORDINATED EXECUTIONS OF ACTIONS

CROSS-REFERENCE TO RELATED APPLICATIONS

This application is a National stage of International Application No. PCT/IN2018/050595, filed Sep. 14, 2018, which is hereby incorporated by reference.

TECHNICAL FIELD

Embodiments of the invention relate to the field of distributed cloud services; and more specifically, to the coordinated executions of actions in a distributed computing system with untrusted entities.

BACKGROUND ART

In many distributed computing systems that can be used for different types of applications, such as logistics, robotics, or service orchestration, etc., multiple local computing agents need to carry out sequences of actions in a coordinated manner with one another. When the computing agents are trusted and collaborating, the coordination can be implemented through simple messaging and book-keeping within the computing agents. However, with untrusted computing agents and environments such as where devices of subsystems of competing local computing agents are involved, the existing solutions enabling the coordination of tasks between these agents can easily break. For example, each computing agent may attempt to optimize their own local gain at the expense of the other computing agents.

Therefore, there is a need to have systems that enforce coordination among, distributed untrusted agents in distributed computing systems. There is a further need to ensure that the execution of the actions on the physical environment indeed takes place as mandated by the system.

SUMMARY OF THE INVENTION

One general aspect includes a method of enabling coordinated executions of actions in a distributed computing system with a plurality of local agents that are untrusted, the method including: recording, in a blockchain database, a smart contract including a plurality of plans that form a global plan, where each one of the plurality of plans includes a set of one or more actions to be executed by a respective one of the plurality of local computing agents; requesting execution of a first action of a first set of actions forming a first one of the plurality of plans by a first of the plurality of local computing agents; requesting execution of a second action of a second set of actions forming a second one of the plurality of plans to be executed by a second of the plurality of local computing agents; determining, based on the smart contract, whether the first action can be executed by the first of the plurality of local computing agents; determining, based on the smart contract, whether the second action can be executed by the second of the plurality of local computing agents; responsive to determining that the first action can be executed, causing the first of the plurality of local computing agents to execute the first action; and responsive to determining that the second action cannot be executed, causing the second of the plurality of local computing agents to not execute the second action.

One general aspect includes a system for enabling coordinated executions of actions in a distributed computing system with a plurality of local agents that are untrusted, the system including: a smart contract generator operative to record, in a blockchain database, a smart contract including a plurality of plans that form a global plan, where each one of the plurality of plans includes a set of one or more actions to be executed by a respective one of the plurality of local computing agents; a first of the plurality of local computing agents operative to request execution of a first action from a first set of actions forming a first one of the plurality of plans to be executed by the first of the plurality of local computing agents, determine, based on the smart contract, whether the first action can be executed by the first of the plurality of local computing agents, and responsive to determining that the first action can be executed, cause the first of the plurality of local computing agents to execute the first action. The system also includes a second of the plurality of local computing agents operative to: request execution of a second action from a second set of actions forming a second one of the plurality of plans to be executed by the second of the plurality of local computing agents, determine, based on the smart contract, whether the second action can be executed by the second of the plurality of local computing agents, and responsive to determining that the second action can be executed, cause the second of the plurality of local computing agents to not execute the second action.

BRIEF DESCRIPTION OF THE DRAWINGS

The invention may best be understood by referring to the following description and accompanying drawings that are used to illustrate embodiments of the invention. In the drawings:

FIG. 4B illustrates a flow diagram of exemplary operations for determining, based on the smart contract, whether the first action can be executed by the first local computing agent in accordance with some embodiments.

FIG. 4C illustrates a flow diagram of exemplary operations for determining, based on the smart contract, whether the second action can be executed by the second local computing agent in accordance with some embodiments.

FIG. 4D illustrates a flow diagram of exemplary operations for determining that the second action cannot be executed, in accordance with some embodiments.

DETAILED DESCRIPTION

Figure 1:
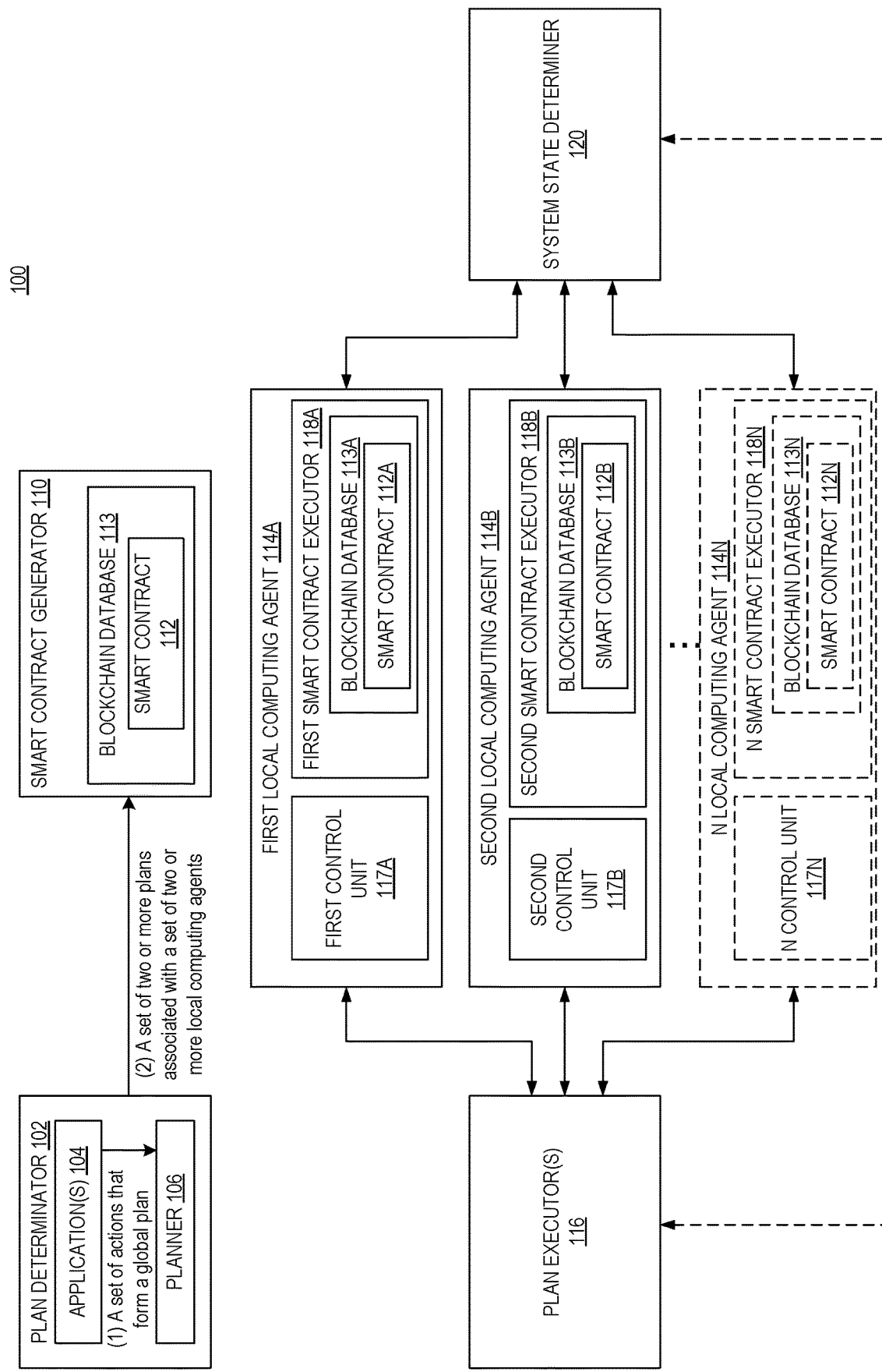
FIG. 1 illustrates a block diagram of an exemplary system 100 for enabling coordinated executions of actions in a distributed computing system with a plurality of local agents that are untrusted, in accordance with some embodiments.

The following description describes methods and apparatus enabling coordinated executions of actions in a distributed computing system with untrusted entities. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

BRACKETED TEXT AND BLOCKS WITH DASHED BORDERS (E.G., LARGE DASHES, SMALL DASHES, DOT-DASH, AND DOTS) MAY BE USED HEREIN TO ILLUSTRATE OPTIONAL OPERATIONS THAT ADD ADDITIONAL FEATURES TO EMBODIMENTS OF THE INVENTION. HOWEVER, SUCH NOTATION SHOULD NOT BE TAKEN TO MEAN THAT THESE ARE THE ONLY OPTIONS OR OPTIONAL OPERATIONS, AND/OR THAT BLOCKS WITH SOLID BORDERS ARE NOT OPTIONAL IN CERTAIN EMBODIMENTS OF THE INVENTION.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Existing distributed computing systems focus on enabling the planning and management of multiple actions/tasks that need to be performed by multiple agents. Existing distributed computing systems do not ensure that the computing agents honor their stated plans during execution. In general, untrustworthy computing agents in the system can be requested to perform a task but may perform another one due to different reasons. For example, a computing agent they may simply hog resources thereby depriving agents who are expected to execute actions and have the rightful access to the resources.

Existing distributed computing systems with multiple computing agents collaborating to execute a global plan have several disadvantages. Current distributed computing systems focus on the planning aspect of the distributed computing per-se, such that a management unit is operative to distribute subset of tasks or actions to each one of the multiple computing agents. However, during execution of the tasks, these existing systems do not ensure that the multiple computing agents properly execute their allocated tasks or actions. In general, untrustworthy computing agents in the system can advertise that they will perform a given task but do another, e.g., they may simply hog resources thereby depriving other computing agents that are expected have access to these resources.

A blockchain system is a platform used for building, running, and deploying a distributed ledger. The distributed ledger permanently records, and in a verifiable way, digital records of transactions that occur between two parties. The distributed ledger is maintained without a central authority or implementation. The distributed ledger is referred to as a blockchain database that includes blocks, which are linked and secured using cryptography.

The embodiments of the present invention present a method and a system for enabling coordinated executions of actions in a distributed computing system with a plurality of local agents that are untrusted. A smart contract including plans that form a global plan is recorded in a blockchain database. Each plan includes a set of actions to be executed by a respective one of local computing agents. Execution of a first action of a first set of actions forming a first one of the plurality of plans by a first of the plurality of local computing agents is requested. Execution of a second action of a second set of actions forming a second one of the plurality of plans to be executed by a second of the plurality of local computing agents is requested. A determination of whether the first action can be executed by the first of the plurality of local computing agents is performed based on the smart contract. A determination of whether the second action can be executed by the second of the plurality of local computing agents is performed based on the smart contract. Responsive to determining that the first action can be executed, the first local computing agent is caused to execute the first action and responsive to determining that the second action cannot be executed, the second local computing agent is caused to not execute the second action.

Blockchains and smart contracts are used in a system including multiple computing agents that need to collaborate to ensure trusted transactions in a distributed, computing environment. In some embodiments, the solution proposed herein involves the generation of a smart contract with local plans forming a global plan. The smart contract when executed between the multiple local agents, which are defined as nodes of the blockchain system, ensures that the execution of the actions by each one of the computing agents is trusted by the other agents. In one exemplary embodiments, local plans (obtained independently, or derived from a global plan) are recorded as a smart contract for the multiple agents. The agents post the messages regarding the intention to carry out an action or its completion, on the copy of the blockchains. The validation and consensus mechanisms run between the multiple computing agents of the system ensure that an action is allowed to be executed by a respective agent when all the dependencies to one or more other actions or conditions are fulfilled. When the computing agent is allowed to carry out an action, it requests a plan executor to execute the action.

The proposed solution has several advantages when compared to prior distributed computing systems. The solution ensures that all computing agents have the same view of the plans executed by all the computing agents. There is a consensus between the different computing agents on the executed actions. The solution also ensures that no single computing agent is a point of failure for the system as the blockchain database storing the smart contract is replicated on each local computing agent acting as a blockchain node. Further, the solution ensures that no single agent works with a mal-intention as it will automatically have to pay the price for doing so by getting malicious requests for actions invalidated. Thus, the solution presented herein allows for collaboration between computing agents in an untrusted distributed computing environment.

FIG. 1 illustrates a block diagram of an exemplary system 100 for enabling coordinated executions of actions in a distributed computing system with a plurality of local agents that are untrusted, in accordance with some embodiments. The system 100 includes plan determinator 102, a smart contract generator 110, a plurality of local computing agents 114A-N, plan executor(s) 116 and system state determiner 120. The system 100 is built on top of a blockchain platform that enables the generation of smart contracts and their execution between multiple blockchain nodes.

The plan determinator 102 includes the applications 104 and a planner 106. The applications 104 can be one or multiple applications that are operative to generate a global plan of actions that are to be executed by the plan executor(s) 116 through the collaboration of one or more local computing agents 114A-N. The applications 104 can operate individually or collectively to output a single global plan that includes a set of actions or alternatively, the applications 104 can output a set of multiple local plans that are already separated and which form when executed in collaboration a global plan of actions. The applications 104 can be a single application or alternatively multiple distinct applications that are coupled with the planner 106. In some embodiments, the planner 106 receives from the applications 104 a set of actions that form a global plan (either as a global plan or as individual local plans that are to be executed in collaboration and which form a global plan) to determine from the set of actions that form the global plan one or more subset of actions, where each subset is less than the entire set of actions and each of the subsets forms a local plan. The planner 106 further determines for each subset of actions a corresponding local computing agent that is to manage the execution of the subset of actions.

The actions are tasks that are to be performed by one or more of the plan executor(s) 116. In some embodiments, the set of actions include one or more actions that need to be performed in collaboration with one another or in a given order. The set of actions are to be performed by software, hardware or a combination of software and hardware components. For example, the actions can be tasks to be performed by computing resources, such as processors, memory, networking resources. The actions can be tasks to be performed by one or more cloud-based services. In other examples, the actions can be tasks to be performed by controller(s) of physical parts of a robot. In other embodiments, the actions can be performed by actuators of sensing devices or IoT devices. Several other examples of the actions and tasks can be contemplated without departing from the scope of the present embodiments.

The smart contract generator 110 is a trusted entity that is accessible to all the local computing agents 114A-N of the system. The smart contract generator 110 is coupled with the plan determinator 102 and is operative to ingest each one of the local plans associated with respective local computing agents 114A-N and to output a smart contract for the multiple local plans. The smart contract generator 110 is operative to record, in a blockchain database 113, a smart contract 112. The smart contract 112 includes a plurality of plans. Each one of the plans includes a set of one or more actions to be executed by a respective one of the local computing agents 114A-N. The generated smart contract is uniform for all local computing agents 114A-N, except for the initialization operation where each specific local plan is stored in a data structure.

The local computing agents 114A-N are software, hardware, or a combination of software and hardware entities that collaborate to execute the set of actions that form the global plan. Typically, some actions from the set of actions are interrelated and may depend on one another. The local computing agents 114A-N may include one or more untrusted entity. For example, the local computing agents 114A-N can be components of a system acting as controller/operator in robotics systems that are used to operate physical components of one or more robots represented by the plan executor(s) 116. In another example, the local computing agents 114A-N can be control components of logistics, service orchestration and also systems-of-systems. In one example, the local computing agents 114A-N can be cloud-based services. In another example, the local computing agents 114A-N can be resources of a distributed computing system such as networking resources, memory resources, processing resources, etc.

Each one of the local computing agents 114A-N includes or has access to local blockchain infrastructure. For example, each one the local computing agents 114A-N includes a respective smart contract executor 118A-N. Each of the smart contract executor 118A-N is a blockchain node and is tied to executing the smart contract 112A-N recorded in the blockchain database 113A-N for the multiple local computing agents 114A-N. Each one of the local computing agents 114A-N has a local copy of the blockchain database 113A-N that includes a copy of the smart contract 112A-N as a result of the recordation of the smart contract by the smart contract generator 110. Each one of the smart contract executors 118A-N is a module operative to execute the smart contract and has access to a copy of the blockchain database 113A-N including a copy of the smart contract 112A-N. The local computing agents may also include a respective control unit 117A-N. The control units 117A-N are operative to communicate with the plan executor(s) 116 and transmits requests for actions and receive confirmation of the execution of the actions.

The system 100 further includes system state determiner 120 and plan executer(s) 116. The system state determiner 120 is operative to obtain the state of the system at a given time. For example, when the system is used for controlling one or more robots, the system state determiner 120 may include one or more sensing devices that record measurements of physical events performed by the robots. In other embodiments, the system state determiner 120 may include one or more sensing devices that record measurements such as temperature, speed, location, etc. of electronic devices that are generally operated or controlled by the local computing agents. In some embodiments, the system state determiner 120 may be a module operative to obtain the state of the multiple components controlled by the local computing agents 114A-N. When the local computing agents 114A-N are software components, controlling software elements running on one or more electronic devices, the system state determiner 120 may obtain the state of execution of the software elements at a given time. As it will be described below, the system state determiner 120 may output and derive measurements that are used for verifications of the preconditions and the effects of the actions that are performed by the different local computing agents 114A-N. These are exposed as a service. Each local computing agent 114A-N can access the values of the predicates (e.g. through REST APIs) to evaluate whether precondition and effects are satisfied.

The plan executor(s) 116 includes one or more modules that are operative to perform the actions that form the global plan. Once the action is verified and validated to be executed for a local computing agent 114A-N. The local computing agent 114A-N transmits requests for performing the actions to one or more plan executor(s) 116. While the plan executor(s) 116 are illustrated as a single module coupled with the multiple local computing agents 114A-N, in some embodiments, the plan executor(s) 116 can include multiple components that are distributed over multiple electronic devices. In one exemplary embodiment, for each local computing agent 114A-N there is a corresponding plan executor 116 that is uniquely coupled with the local computing agent 114A-N. In another embodiment, a single plan executor 116 may receive requests for actions from two or more local computing agents 114A-N. In a third exemplary embodiment, a single local computing agent 114A-N can transmit requests to two or more plan executors 116. The plan executor(s) 116 can be hardware or software components, or a combination of both. For example, a plan executor can be a software processing thread, a virtual machine, or a cloud computing service, etc. Alternatively, the plan executor(s) 116 can be a physical component of a robot and a controller, a sensor and its actuator, an IoT device, etc.

In operation, once the planner 106 has determined the set of plans to be executed by the multiple local computing agents 114A-N, the smart contract generator 110 records the smart contract including the plans in the blockchain database 113. This results in having the smart contract 112A-N duplicated in the local copies of the blockchain databases 113A-N of each one of the local computing agents 114A-N. Each one of the plurality of plans includes a set of one or more actions to be executed by a respective one of the plurality of local computing agents 114A-N, and the plurality of plans form a global plan. The smart contract includes a list of completed actions, where the completed actions were previously executed by one or more local computing agents 114A-N and recorded in the blockchain database 113 after completion and confirmation of the execution; code for executing the set of actions that are to be performed by each one of local computing agents 114A-N. In some embodiments, each action is associated with a) zero or more previous actions that are to be performed prior to execution of the action itself, b) a precondition that needs to be satisfied prior to execution of the action, the precondition indicating the state of the system, c) the expected result from the action; d) the one or more identifier of local computing agents 114A-N and/or one or more actions that need to receive the confirmation that the action is performed and the result of execution of the action.

In the system 100, execution of the local plans by the local computing agents 114A-N is performed by execution of the smart contract 112A-N recorded in the blockchain database 113A-N. This enables the collaborative execution of all the actions based on a trusted platform that requires each one of the local computing agents 114A-N to execute an action only when it is validated by the blockchain platform as a result of recordation and execution of the smart contract including all the actions for the multiple local computing agents 114A-N.

The proposed solution has several advantages when compared to prior distributed computing systems. The solution ensures that all computing agents have the same view of the plans executed by all the computing agents. There is a consensus between the different computing agents on the executed/completed actions. The recordation of the actions in association with the identification of the local computing agent that is to execute the action, the preconditions that need to be satisfied prior to execution of the agent, the previous actions that need to be executed prior to execution of the action, the action's expected result and agent/action that is expected to receive the result of the action enables to trust the execution of the actions. The solution also ensures that no single computing agent is a point of failure for the system as the blockchain database storing the smart contract is replicated on each local computing agent acting as a blockchain node. Further, the solution ensures that no single agent works with a mal-intention as it will automatically have to pay the price for doing so by getting malicious requests for actions invalidated. Thus, the solution presented herein allows for collaboration between computing agents in an untrusted distributed computing environment.

Figure 2A:
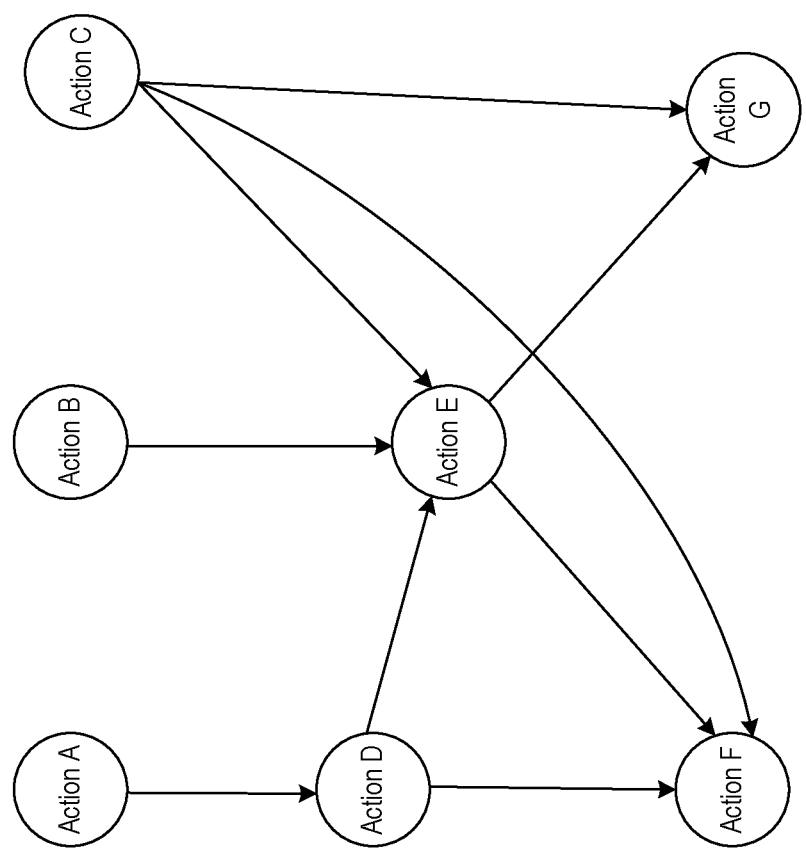
FIG. 2A illustrates a non-limiting exemplary global plan that is to be executed by a set of three local computing agents in accordance with some embodiments.

FIG. 2A illustrates a non-limiting exemplary global plan that is to be executed by a set of three local computing agents in accordance with some embodiments. The example of FIG. 2A is intended to be exemplary only and will be used for description of the operations of FIGS. 3A-F. However, one of ordinary skill in the art would understand that other examples of global plans can be contemplated without departing from the scope of the present embodiments. The global plan 200 includes a set of actions A-G, where some of the actions depend from one another. For example, action D requires that action A be executed prior its execution. Action E requires execution of D, C, and B. Action F requires execution of action E, D, and C, etc.

Figure 2B:
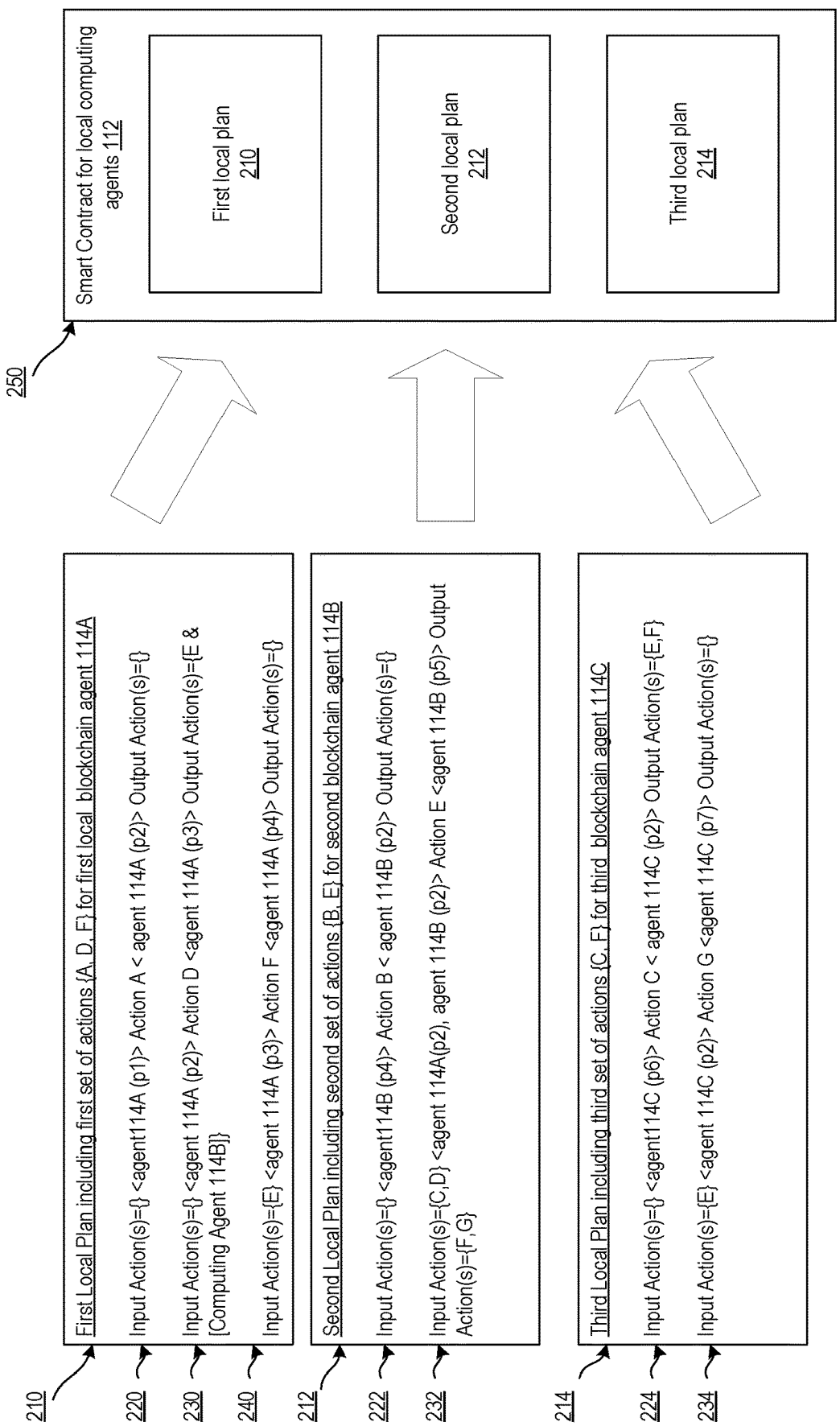
FIG. 2B illustrates a non-limiting exemplary set of local plans that form the global plan, in accordance with some embodiments.

FIG. 2B illustrates a non-limiting exemplary set of local plans that form the global plan 200. Each one of the local plans is to be executed by a respective one from the local computing agents 114A-N. For example, local plan 210 is to be executed by local computing agent 114A, local plan 212 is to be executed by second local computing agent 114B, and local plan 216 is to be executed by a third local computing agent 114C. The first local plan 210 includes three actions (220, 230, and 240) that are to be executed by the local computing agent 114A. Each one of the actions 220, 230, and 240 includes a) zero or more previous actions that are to be performed prior to execution of the action itself, b) a precondition that needs to be satisfied prior to execution of the action, the precondition indicating the state of the system being controller or operated through the actions of the computing agents, c) the action to be performed, d) the expected result from the action; e) the one or more identifiers of local computing agents and/or one or more actions that need to receive the confirmation that the action is performed and/or the result of execution of the action.

For example, action 220 includes: an empty set for the input action indicating that no action needs to be performed prior to execution of the action itself; an indication that precondition p1 needs to be satisfied prior to execution of the action by the local computing agent 114A, the precondition indicating the state of the system being controlled or operated through the actions of the computing agents; a definition of the action to be performed, here action A; the expected result from the action, p2 that is the result of performing action A in local computing agent 114A; and one or more identifier of local computing agents and/or one or more actions that need to receive the confirmation that the action is performed and/or the result of execution of the action, here no computing agent nor action is to receive the result of the action A.

Action 230 includes: an empty set for the input action indicating that no action needs to be performed prior to execution of the action itself; an indication that precondition p2 needs to be satisfied prior to execution of the action by the local computing agent 114A, the precondition indicating the state of the system being controlled or operated through the actions of the computing agents; a definition of the action to be performed, here action D; the expected result from the action, p3 that is the result of performing action D in local computing agent 114A; and one or more identifiers of local computing agents and/or one or more actions that need to receive the confirmation that the action is performed and/or the result of execution of the action, here action E and second local computing agent 114B.

For example, action 240 includes: a set of input action indicating that action E needs to be performed prior to execution of the action itself; an indication that precondition p3 needs to be satisfied prior to execution of the action by the local computing agent 114A, the precondition indicating the state of the system being controlled or operated through the actions of the computing agents; a definition of the action to be performed, here action F; the expected result from the action, p4 that is the result of performing action F in local computing agent 114A; and one or more identifiers of local computing agents and/or one or more actions that need to receive the confirmation that the action is performed and/or the result of execution of the action, here no computing agent nor action is to receive the result of the action F.

The second local computing agent 114B is also assigned a subset 212 of actions from the global plan that include actions 222 and 232 that are to be executed. Action 222 includes: an empty set for the input action indicating that no action needs to be performed prior to execution of the action itself; an indication that precondition p2 needs to be satisfied by second local computing agent 114B prior to execution of the action by the second local computing agent 114B, the precondition indicating the state of the system being controlled or operated through the actions of the computing agents; a definition of the action to be performed, here action B; the expected result from the action, p2 that is the result of performing action B in second local computing agent 114B; and one or more identifiers of local computing agents and/or one or more actions that need to receive the confirmation that the action is performed and/or the result of execution of the action, here no action and computing agent is to receive this result.

Action 232 includes: a set of input action indicating that actions C and D need to be performed prior to execution of the action itself; an indication that precondition p2 needs to be satisfied by local computing agent 114A and precondition p2 needs to be satisfied by second local computing agent 114B prior to execution of the action by the second local computing agent 114B, the precondition indicating the state of the system being controlled or operated through the actions of the computing agents; a definition of the action to be performed, here action E; the expected result from the action, p5 that is the result of performing action E in second local computing agent 114B; and one or more identifiers of local computing agents and/or one or more actions that need to receive the confirmation that the action is performed and/or the result of execution of the action, here actions F and G are to receive the confirmation and the result of execution of the action E.

The local computing agent 114C is also assigned a subset 214 of actions from the global plan that include actions 224 and 234 that are to be executed. Action 224 includes: an empty set for the input action indicating that no action needs to be performed prior to execution of the action itself; an indication that precondition p6 needs to be satisfied by local computing agent 114C prior to execution of the action by the local computing agent 114C, the precondition indicating the state of the system being controlled or operated through the actions of the computing agents; a definition of the action to be performed, here action C; the expected result from the action, p2 that is the result of performing action C in local computing agent 114C; and one or more identifiers of local computing agents and/or one or more actions that need to receive the confirmation that the action is performed and/or the result of execution of the action, here actions E and F are to receive the confirmation and/or the result.

Action 234 includes: a set of input action indicating that action E need to be performed prior to execution of the action itself; an indication that precondition p2 needs to be satisfied by local computing agent 114C prior to execution of the action by the local computing agent 114C, the precondition indicating the state of the system being controlled or operated through the actions of the computing agents; a definition of the action to be performed, here action G; the expected result from the action, p7 that is the result of performing action G in local computing agent 114C; and one or more identifiers of local computing agents and/or one or more actions that need to receive the confirmation that the action is performed and/or the result of execution of the action, here no action is to receive the confirmation and the result of execution of the action G.

Figure 3A:
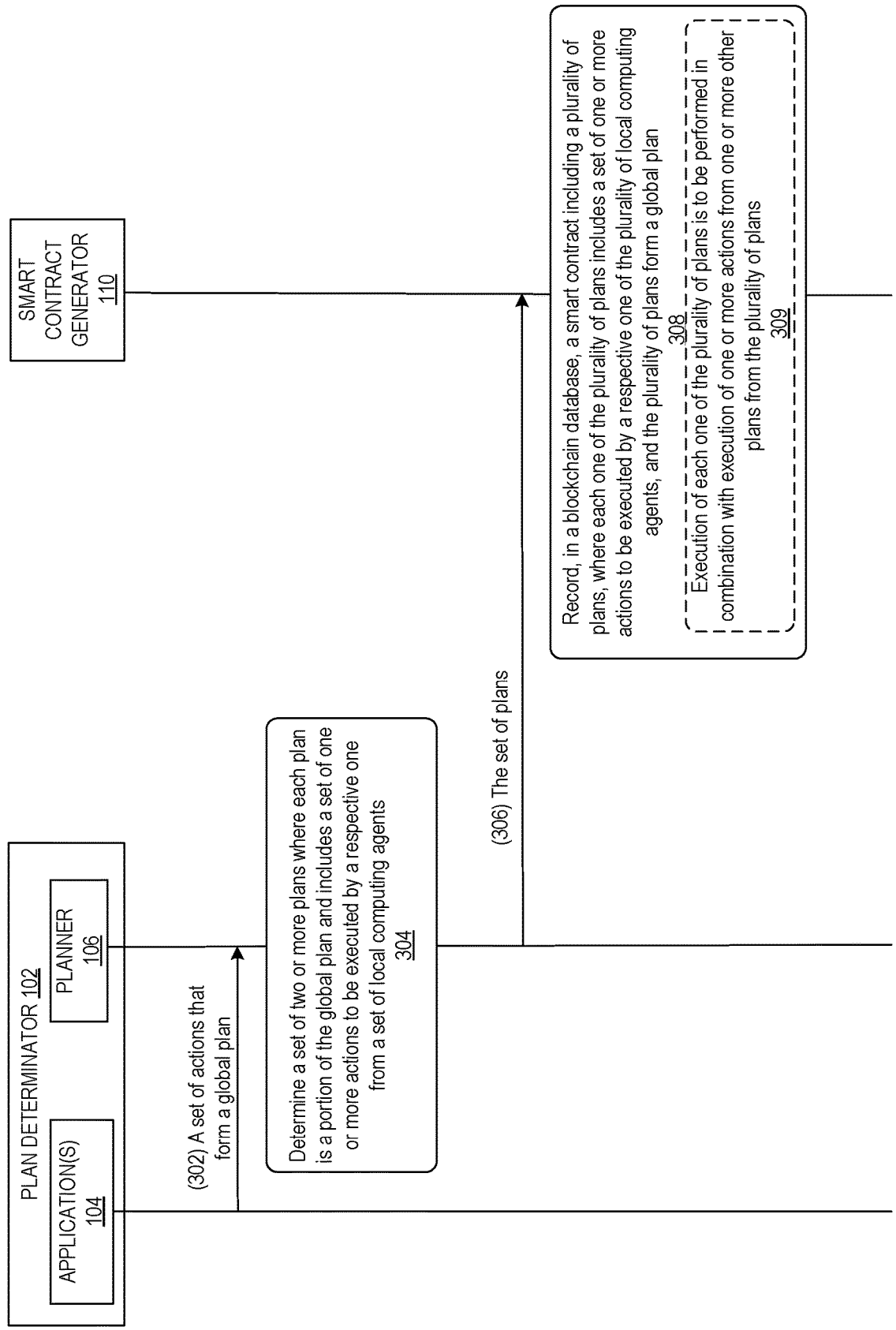
FIG. 3A illustrates a block diagram of exemplary operations for determining a smart contract including actions to be performed by multiple computing agents in accordance with some embodiments.

FIG. 3A illustrates a block diagram of exemplary operations for determining a smart contract including actions to be performed by multiple computing agents in accordance with some embodiments. At operation 302, a set of actions is received from one or more applications. The set of actions are tasks to be performed in a distributed computing system and form a global plan. In some embodiments, the set of actions is received as a single global plan. Alternatively, in other embodiment, the set of actions is received as multiple subsets of actions that need to be collectively performed.

The set of actions include one or more actions that need to be performed in collaboration with one another or in a given order. The planner 106 determines, at operation 304, a set of two or more plans where each plan is a portion of the global plan and includes a set of one or more actions to be executed by a respective one from a set of local computing agents. The planner 106 may have access to a set of local computing agents (e.g., local computing agents 114A-N) of a distributed computing system and is operative to determine for each computing agent a set of actions from the global plan that need to be performed by that given agent. For example, the computing agents may be a set of computing resources, such as processors, memory, networking resources that need to be used in collaboration to allow implementations of one or more applications. In other examples, the computing agents may be controller of physical parts of a robot that can be used to control the movement of the robot. Several other examples of the computing agents can be contemplated without departing from the scope of the present embodiments.

At operation 306, the set of plans are transmitted to the smart contract generator 110. The smart contract generator 110 records, in a blockchain database, a smart contract including a plurality of plans. Each one of the plurality of plans includes a set of one or more actions to be executed by a respective one of the plurality of local computing agents. Execution of each one of the plurality of plans is to be performed in combination with execution of one or more actions from one or more other plans from the plurality of plans. In some embodiments, each one of the set of plans is a sequence of actions to be performed by a given computing agent annotated with dependencies and environment states. As illustrated with reference to FIGS. 2A-B, each action in a plan can be of the format: <Input Action><Precondition>Action<Action's result><Output Action/Agent>.

Where, Input Action denotes the actions that should have been completed before execution of the current action can start. Output Action/Agent indicates the computing agent(s) and/or actions to whom the completion message for the current action and/or the result of execution of the action is to be sent. Precondition and Action's result are precondition(s) and effect/results expected to be obtained from execution of the action.

Each local computing agent has access to a local copy of the smart contract in a local copy of the blockchain database and may perform the following operations on the blockchain: request-for(action), completed (action, effect (action)). A Request-for(action) is validated when the completion list is sufficient, and precondition is satisfied. Completed (action, effect(action)) is validated when effect (action) is satisfied.

Figure 3B:
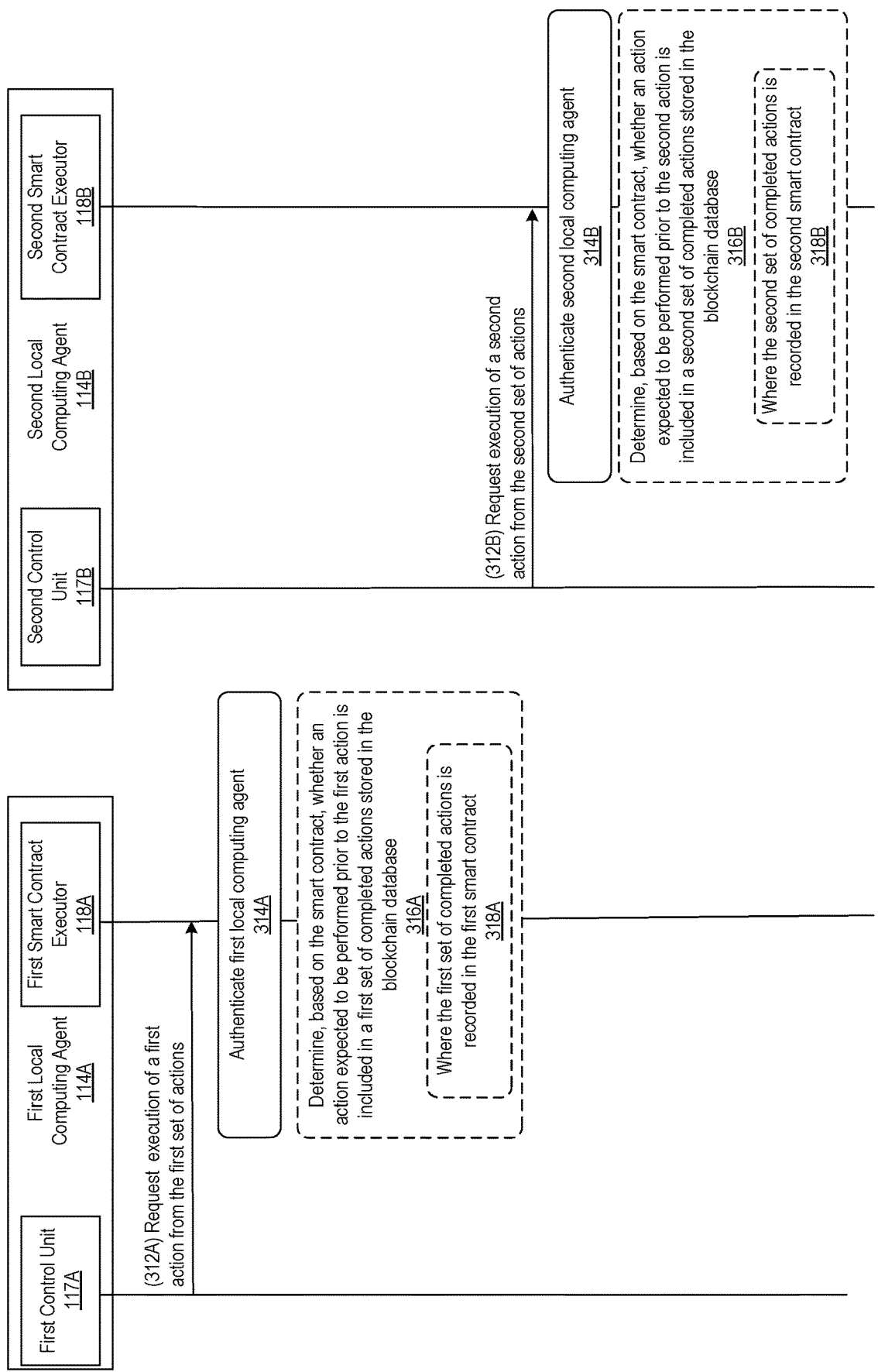
FIG. 3B illustrates a block diagram of exemplary operations for execution of the actions by the multiple computing agents of the distributed computing system based on the smart contract, in accordance with some embodiments.

FIG. 3B illustrates a block diagram of exemplary operations for execution of the actions by the multiple computing agents of the distributed computing system based on the smart contract in accordance with some embodiments. At operation 312A, the first control unit 117A of the local computing agent 114A requests execution of a first action from a first set of actions. The first set of actions forms a first one of the plans that is defined to be executed by the first local computing agents 114A. For example, the first action can be action F that is to be executed by first local computing agent 114A. The request for execution of the first action indicates an intent of the local computing agent 114A to execute the first action and launches the execution of the action as recorded in the smart contract. This request can be an explicit request originating from an administrator or an application. Alternatively, the request can originate from the code of the smart contract itself as a result of execution of a succession of the actions in the first set of actions associated with the first local computing agent 114A.

The smart contract executor 118A is a module of the first local computing agent 114A that is operative to execute the smart contract and has access to a copy of the blockchain database. The first smart contract executor 118A is a blockchain node. The first smart contract executor 118A is operative to determine, based on the smart contract, the first action can be executed. The determination of whether the action can be executed can be performed by determining whether one or more previous actions have been performed and by determining whether the preconditions to the execution of the action are satisfied as it is described in further details herein.

At operation 314A, the first smart contract executor 118A of the first local computing agent 114A authenticates the first local computing agent 114A. In some embodiments, the authentication of the first local computing agent 114A is performed based on a public/private cryptographic key authentication mechanism. A public/private cryptographic key is assigned to the first local computing agent 114A and is used to identify the local computing agent 114A. The public/private cryptographic key is used to authenticate the local computing agent 114A when performing operations on the blockchain that stores the smart contract.

In one embodiment, once the local computing agent 114A is authenticated, the first smart contract executor 118A determines, based on the smart contract recorded in the blockchain database, whether an action expected to be performed prior to the first action is included in a set of completed actions stored in the blockchain database. The first smart contract executor 118A determines based on a list of completed actions stored as part of the smart contract in the blockchain database whether this list includes the action that is expected to be performed prior to the requested action.

At operation 312B, the second control unit 117B of the second local computing agent 114B requests execution of a second action from a second set of actions. The second set of actions forms a second one of the plans that is defined to be executed by the second local computing agents 114B. For example, the second action can be action E that is to be executed by second local computing agent 114B. The request for execution of the second action indicate an intent of the second local computing agent 114B to execute the second action and launches the execution of the action as recorded in the smart contract. This request can be an explicit request originating from an administrator or an application. Alternatively, the request can originate from the code of the smart contract itself as a result of execution of a succession of the actions in the second set of actions associated with the second local computing agent 114B.

The second smart contract executor 118B is a module of the second local computing agent 114B that is operative to execute the smart contract and has access to a copy of the blockchain database. The second smart contract executor 118B is a blockchain node separate from the first smart contract executor 118A. The second smart contract executor 118B is operative to determine, based on the smart contract, the second action can be executed. The determination of whether the action can be executed can be performed by determining whether one or more previous actions have been performed and by determining whether the preconditions to the execution of the action are satisfied as it is described in further details herein.

At operation 314B, the second smart contract executor 118B of the second local computing agent 114B authenticates the second local computing agent 114B. In some embodiments, the authentication of the second local computing agent 114B is performed based on a public/private cryptographic key authentication mechanism. A public/private cryptographic key is assigned to the second local computing agent 114B and is used to identify the second local computing agent 114B. The public/private cryptographic key is used to authenticate the second local computing agent 114B when performing operations on the blockchain that stores the smart contract.

In one embodiment, once the second local computing agent 114B is authenticated, the second smart contract executor 118B determines, based on the smart contract recorded in the blockchain database, whether an action expected to be performed prior to the second action is included in the set of completed actions stored in the blockchain database. The second smart contract executor 118B determines based on the list of completed actions stored as part of the smart contract in the blockchain database whether this list includes the action that is expected to be performed prior to the requested second action.

While the operations 312A-318A and 312B-318B are illustrated and described in a particular order, the operations can be performed in a different order. For example, the receipt of the request for the second action can be performed prior to the receipt of the request for the first action. In another example, the receipt of the requests for the first and the second action can be received substantially simultaneously by the respective smart contract executors 118A-B. In other examples, the request for the first action can be received prior to the request for the second action. Various additional embodiments can be contemplated without departing from the scope of the present embodiments.

Figure 3C:
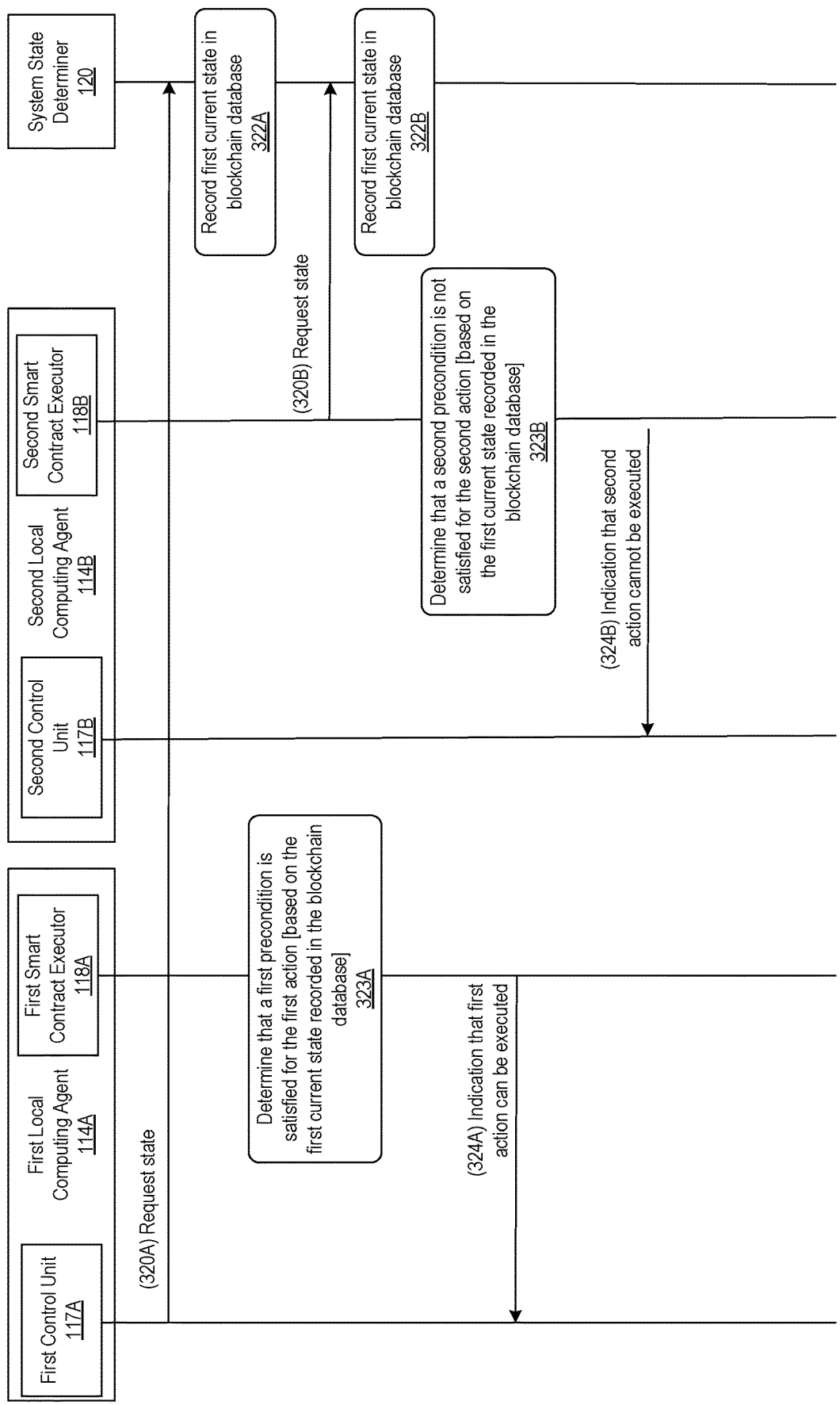
FIG. 3C illustrates a block diagram of exemplary operations for execution of the actions by the multiple computing agents of the distributed computing system based on the smart contract, in accordance with some embodiments.

FIG. 3C illustrates a block diagram of exemplary operations for execution of the actions by the multiple computing agents of the distributed computing system based on the smart contract in accordance with some embodiments. At operation 320A the first control unit 117A requests the state of the system from system state determiner 120. In some embodiments, requesting the state of the system may include obtaining the current state of the local computing agents 114A-N collaborating to execute the actions of the global plan. In some embodiments, requesting the state of the system may further include obtaining from one or more sensors that are coupled with modules controlled by the local computing agents 114A-N sensor measurements indicating the state of the system that is operated/controlled by the local computing agents 114A-N through the execution of the multiple actions forming the global plan. At operation 322A, as a result of a request for the state of the system, the system state determiner 120 records the state of the system in the blockchain database as part of the smart contract. At operation 323A, the first smart contract executor 118A automatically determines, as a result of the recordation of the state of the system in the blockchain database at operation 322A, that a first precondition is satisfied for the first action. Upon determination that the precondition is satisfied, based on the smart contract for the first local computing agent 114A, it is determined that the first action can be executed by the first local computing agent 114A and an indication that the first action can be executed is transmitted at operation 324A to the first control unit 117A.

At operation 320B the second control unit 117B requests the state of the system from system state determiner 120. In some embodiments, requesting the state of the system may include obtaining the current state of the local computing agents 114A-N collaborating to execute the actions of the global plan. In some embodiments, requesting the state of the system may further include obtaining from one or more sensors that are coupled with modules controlled by the local computing agents 114A-N sensor measurements indicating the state of the system that is operated/controlled by the local computing agents 114A-N through the execution of the multiple actions forming the global plan. At operation 322B, as a result of a request for the state of the system, the system state determiner 120 records the state of the system in the blockchain database as part of the smart contract. At operation 323B, the second smart contract executor 118B automatically determines, as a result of the recordation of the state of the system in the blockchain database at operation 322B, that a second precondition is not satisfied for the second action. Upon determination that the precondition is not satisfied, based on the smart contract for the second local computing agent 114B, it is determined that the second action cannot be executed by the second local computing agent 114B and an indication that the second action cannot be executed is transmitted at operation 324B to the second control unit 117B.

In some embodiments, in order to determine that an action can be performed, each one of the smart contractor executors determines that the preconditions are satisfied and that all actions expected to be performed prior to the current have been executed. In other embodiments, as illustrated with the example of FIGS. 2A-B, there are no actions that are expected to be performed prior to the current.

Figure 3D:
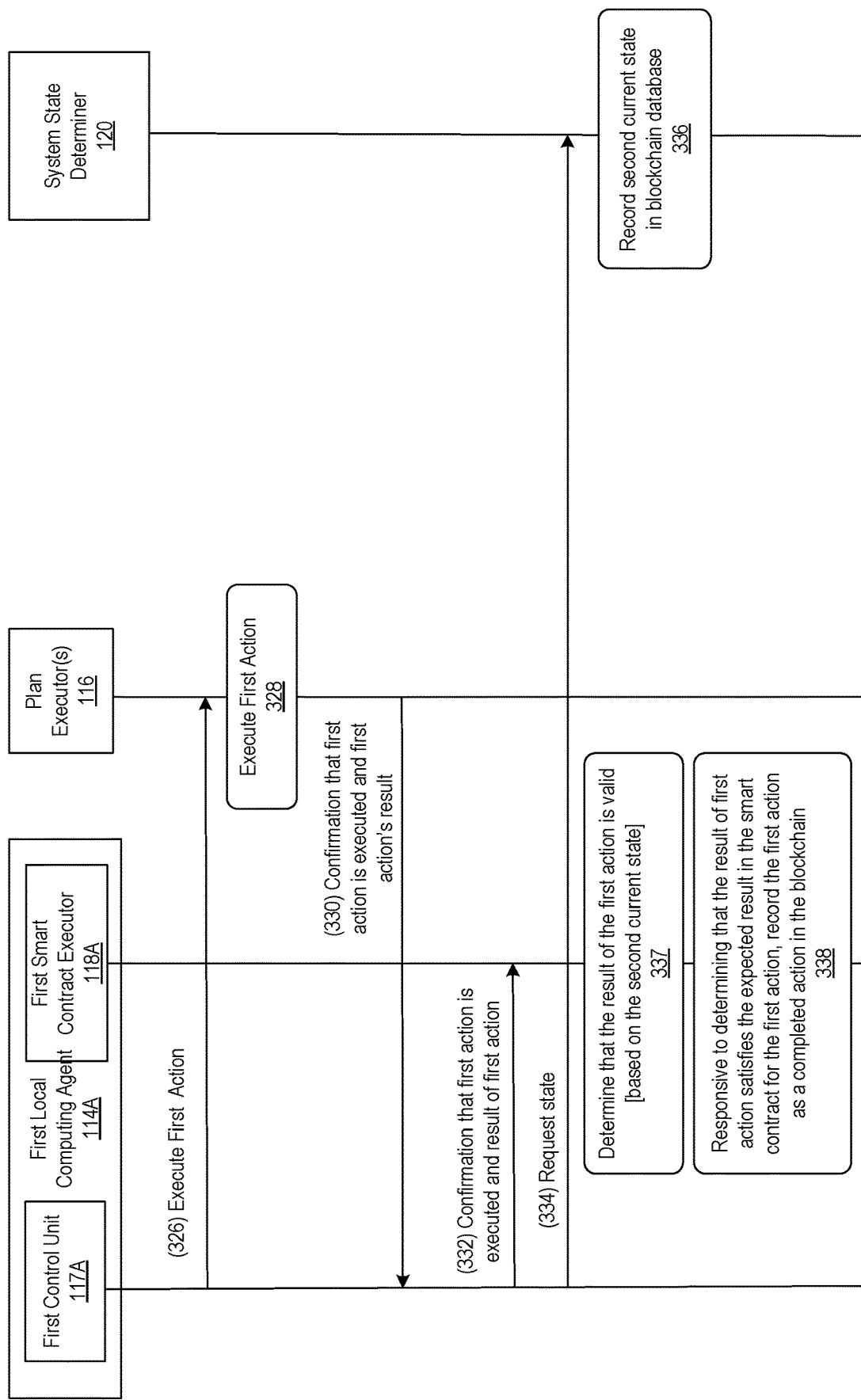
FIG. 3D illustrates a block diagram of exemplary operations performed when an action is executed following the determining that the action is authorized based on the smart contract, in accordance with some embodiments.

FIG. 3D illustrates a block diagram of exemplary operations performed when an action is executed following the determining that the action is authorized based on the smart contract, in accordance with some embodiments. At operation 326 upon determination that the first action can be performed the first control unit 117A transmits a command to execute first action to the plan executor(s) 116. The plan executor(s) 116 executes the first action and sends a confirmation to the first control unit 117A that the first action is executed at operation 330. The message including the confirmation may further include the result of the execution of the action. The first control unit 117A transmits the confirmation and the action's result to the smart contract executor 118A at operation 332 and requests, at operation 334, to obtain a state of the system following the execution of the action. This causes the system state determiner to record the current state of the system in the blockchain database, at operation 336. The smart contract executor determines that the action's result is valid at operation 337. For example, the smart contract executor determines that the state recorded at operation 336 corresponds to the expected result associated with the execution of the first action by the local computing agent 114A as recorded in the smart contract. At operation 338, responsive to determining that result of first action satisfies expected result in first smart contract for the first action, the first smart contract executor 118A records the first action as a completed action in the blockchain database.

Figure 3E:
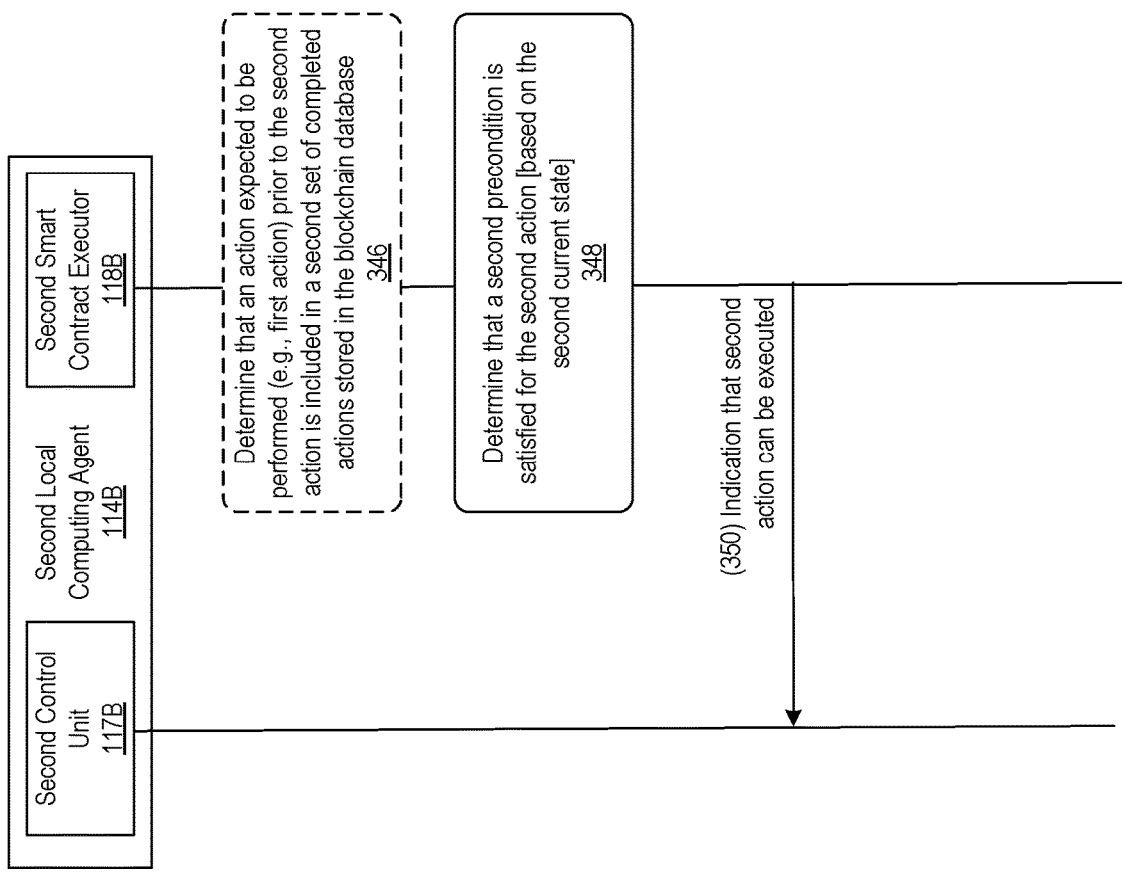
FIG. 3E illustrates a block diagram of exemplary operations for determining that the second action can be executed by the second computing agent in accordance with some embodiments.

FIG. 3E illustrates a block diagram of exemplary operations for determining that the second action can be executed by the second computing agent in accordance with some embodiments. At operation 346, the smart contract executor of the second local computing agent 114B determines that an action expected to be performed (e.g., first action) prior to the second action is included in a second set of completed actions stored in the blockchain database. In this example, the first action has been recorded in the set of completed action and the second smart contract executor 118B based on the smart contract that it has been completed and can now determine whether the preconditions for the second action are satisfied. At operation 348, the smart contract executor determines that a second precondition is satisfied for the second action based on the second current state and based on the smart contract that records the precondition for the second action. At operation 350 an indication that second action can be executed is transmitted to the control unit 117B.

Figure 3F:
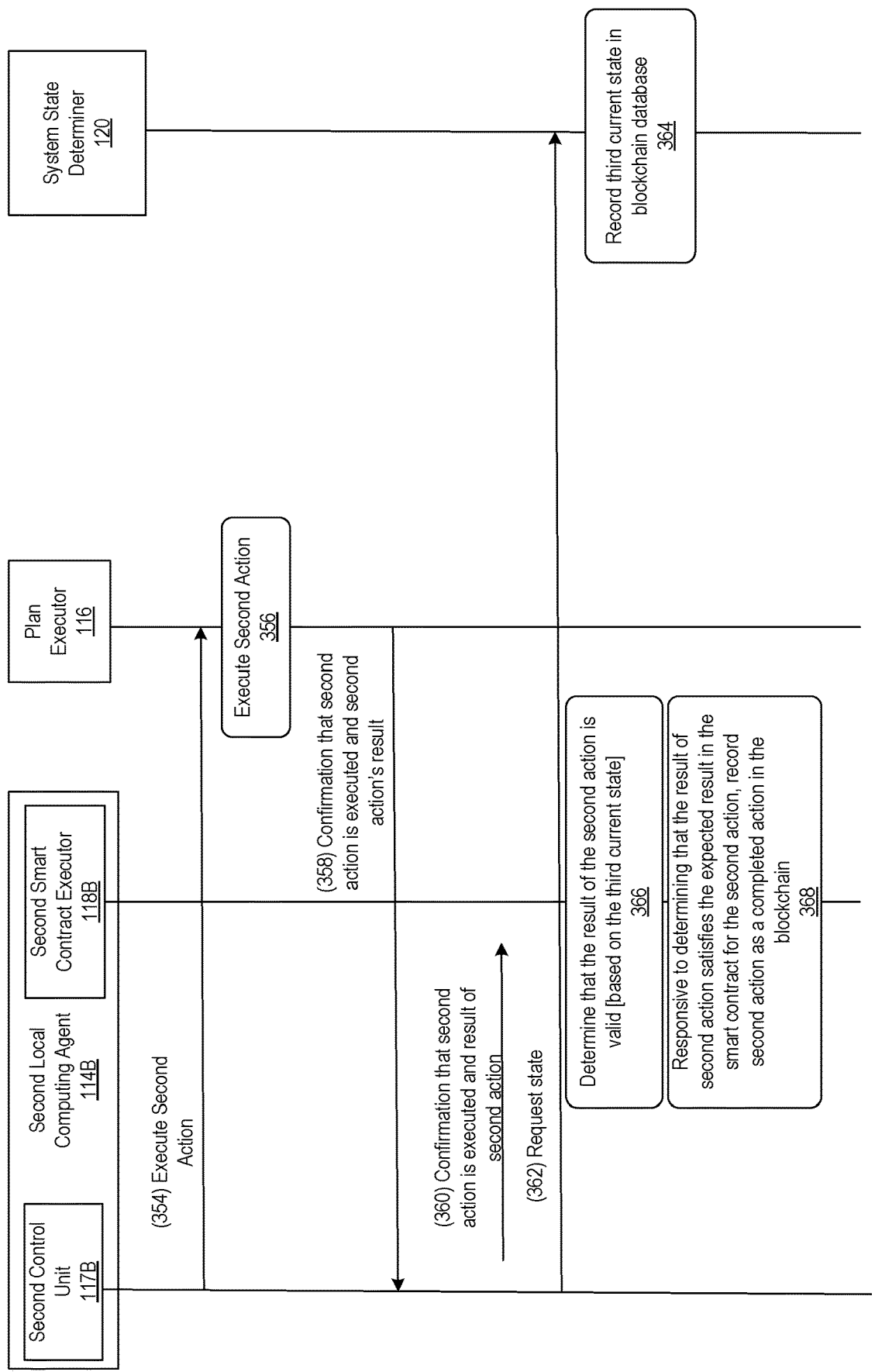
FIG. 3F illustrates a block diagram of exemplary operations performed for executing the second action when it is determined that the action is authorized, in accordance with some embodiments.

FIG. 3F illustrates a block diagram of exemplary operations performed for executing the second action when it is determined that the action is authorized, in accordance with some embodiments. At operation 354 upon determination that the second action can be performed, the second control unit 117B transmits a command to execute the second action to the plan executor(s) 116. The plan executor(s) 116 executes the second action and sends a confirmation to the second control unit 117B that the second action is executed at operation 358. The message including the confirmation may further include the result of the execution of the action. The second control unit 117B transmits the confirmation and the action's result to the smart contract executor 118B at operation 360 and requests, at operation 362, to obtain a state of the system following the execution of the action. This causes the system state determiner 120 to record the current state of the system in the blockchain database, at operation 364. The second smart contract executor 118B determines that the action's result is valid at operation 366. For example, the smart contract executor determines that the state recorded at operation 364 corresponds to the expected result associated with the execution of the second action by the local computing agent 114B as recorded in the smart contract. At operation 368, responsive to determining that result of second action satisfies the expected result in smart contract for the second action, the second smart contract executor 118B records the second action as a completed action in the blockchain database.

The operations in the flow diagrams below will be described with reference to the exemplary embodiments of the FIGS. 1-3F. However, it should be understood that the operations of the flow diagrams can be performed by embodiments of the invention other than those discussed with reference to the other figures, and the embodiments of the invention discussed with reference to FIGS. 1-3F can perform operations different than those discussed with reference to the flow diagrams.

Figure 4A:
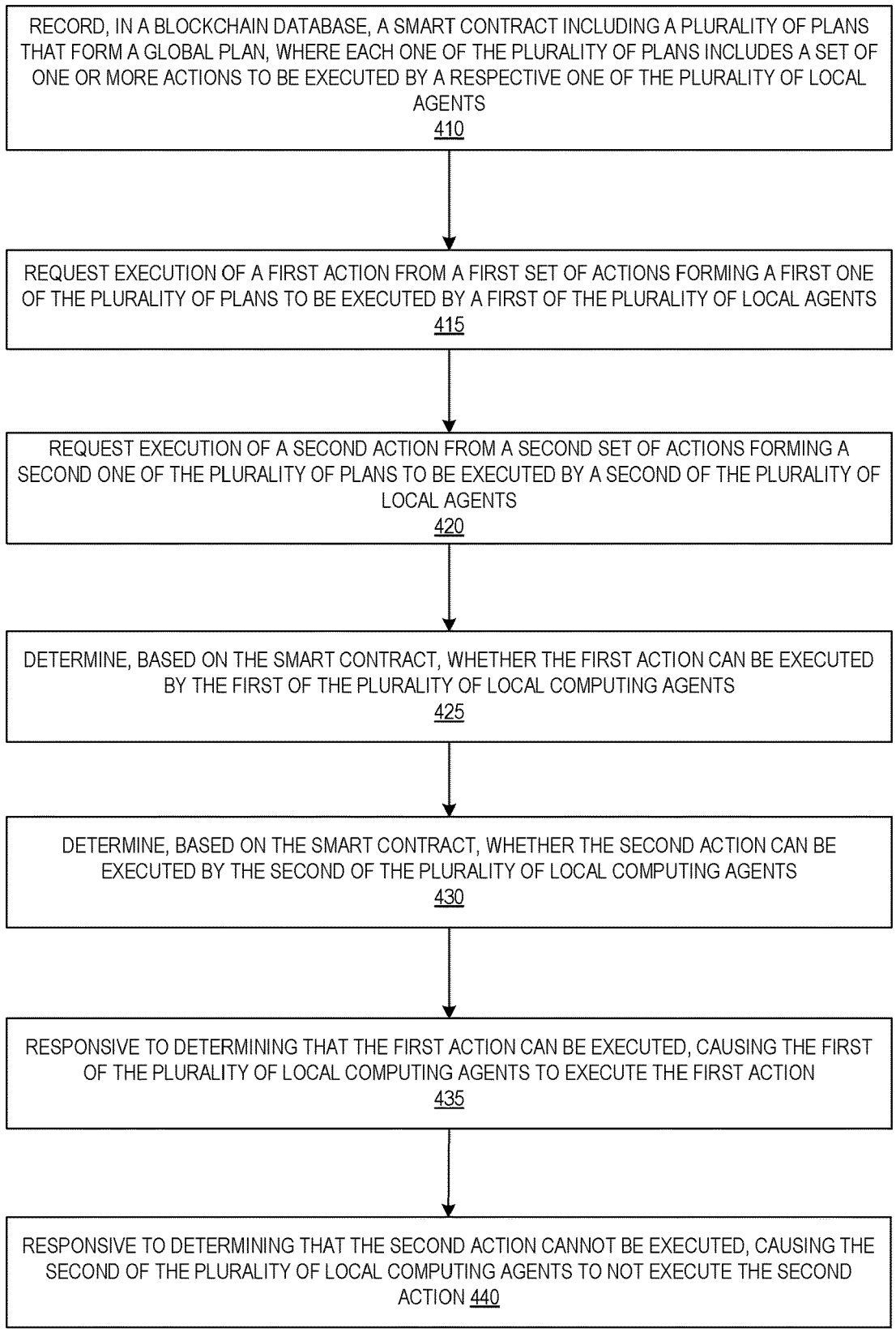
FIG. 4A illustrates a flow diagram of exemplary operations for enabling coordinated executions of actions in a distributed computing system with untrusted entities, in accordance with some embodiments.

FIG. 4A illustrates a flow diagram of exemplary operations for enabling coordinated executions of actions in a distributed computing system with untrusted entities, in accordance with some embodiments. In some embodiments, the operations of FIG. 4A are performed by one or more components of the system 100 as discussed with reference to FIG. 1. In other embodiments, other systems may execute the operations of FIG. 4A without departing from the scope of the present embodiments. At operation 410, a smart contract including multiple plans that form a global plan is recorded in a blockchain database. Each one of the plans includes a set of one or more actions to be executed by a respective one of the plurality of local computing agents. In some embodiments, each action of a local plan is recorded in association with the computing agent that is to execute the action. Each action recorded for a given plan of a local computing agent includes a) zero or more previous actions that are to be performed prior to execution of the action itself, b) a precondition that needs to be satisfied prior to execution of the action, the precondition indicating the state of the system being controller or operated through the actions of the computing agents, c) the action to be performed, d) the expected result from the action; e) the one or more identifiers of local computing agents and/or one or more actions that need to receive the confirmation that the action is performed and/or the result of execution of the action. For example, a smart contract generator 110 records the smart contract for the multiple local computing agents 114A-N, where each computing agent is associated with a set of actions that it is to execute, and which are recorded as part of the smart contract At operation 415, the execution of a first action by a first local computing agent is requested. The first action is an action of a first set of actions forming a first plan. The first plan is a subset of the global plan, which is to be executed by the first local computing agent. For example, the set of actions of the first plan is determined by the planner 106 for execution by the first local computing agent 114A. At operation 420, the execution of a second action by a second one of local computing agents is requested. The second action is an action of a second set of actions forming a second plan. In some embodiments, the second plan is different from the first plan. For example, the second plan is different from the first plan in at least the fact that it has to be executed by a second computing agent that is different and separate from the first computing agent.

At operation 425, a determination is performed based on the smart contract, of whether the first action can be executed by the first local computing agent. In some embodiments, determining, based on the smart contract, whether the first action can be executed by the first local computing agent includes operations 426 and 427 as illustrated in FIG. 4B. FIG. 4B illustrates a flow diagram of exemplary operations for determining, based on the smart contract, whether the first action can be executed by the first local computing agent in accordance with some embodiments. At operation 426, a determination is performed based on the smart contract, whether an action expected to be executed prior to the first action is included in a set of completed actions stored in the blockchain database. The set of completed actions includes one or more actions already executed by one or more of the local computing agents. In some embodiments, there is no action that needs to be completed prior to the first action and this operation 427 is skipped. At operation 428, a determination is performed based on the smart contract, of whether a first set of one or more preconditions to be satisfied prior to the execution of the first action is satisfied.

At operation 430, a determination is performed based on the smart contract, of whether the second action can be executed by the second local computing agent. In some embodiments, determining, based on the smart contract, whether the second action can be executed by the second local computing agent includes operations 431 and 432 illustrated in FIG. 4C. FIG. 4C illustrates a flow diagram of exemplary operations for determining, based on the smart contract, whether the second action can be executed by the second local computing agent in accordance with some embodiments. At operation 431, a determination is performed based on the smart contract, whether an action expected to be executed prior to the second action is included in a set of completed actions stored in the blockchain database. The set of completed actions includes one or more actions already executed by one or more of the local computing agents. In some embodiments, there is no action that needs to be completed prior to the second action and this operation 431 is skipped. At operation 432, a determination is performed based on the smart contract, of whether a second set of one or more preconditions to be satisfied prior to the execution of the second action is satisfied.

The flow of operations moves to operation 435, responsive to determining that the first action can be executed, the first local computing agent is caused to execute the first action. In some embodiments, determining that the first action can be executed includes determining that any action that needs to be completed prior to the execution of the first action is included in the set of completed actions stored in the blockchain database, which is performed through execution of the smart contract for the local computing agent. In addition, in some embodiments, the determination that the first action can be executed may include determining that the preconditions expected to be executed prior to the execution of the first action are satisfied. In some embodiments, if either one of the preconditions or the completed action condition is not satisfied, the first action cannot be executed.

At operation 440, responsive to determining that the second action cannot be executed, the second local computing agent is caused to not execute the second action. In some embodiments, determining that the second action can be executed includes determining that any action that needs to be completed prior to the execution of the second action is included in the set of completed actions stored in the blockchain database, which is performed through execution of the smart contract for the local computing agent. In addition, in some embodiments, the determination that the second action can be executed may include determining that the preconditions expected to be executed prior to the execution of the second action are satisfied. In some embodiments, if either one of the preconditions or the completed action condition is not satisfied, the second action cannot be executed. For example, when the first action is expected to be executed prior to the second action and the first action has not yet been competed, determining that the second action cannot be executed includes determining (operation 441 of FIG. 4D) that the first action is not included in the set of completed actions stored in the blockchain database. Alternatively, when the first action is stored in the set of completed actions, the second action is can be executed.

Figure 5:
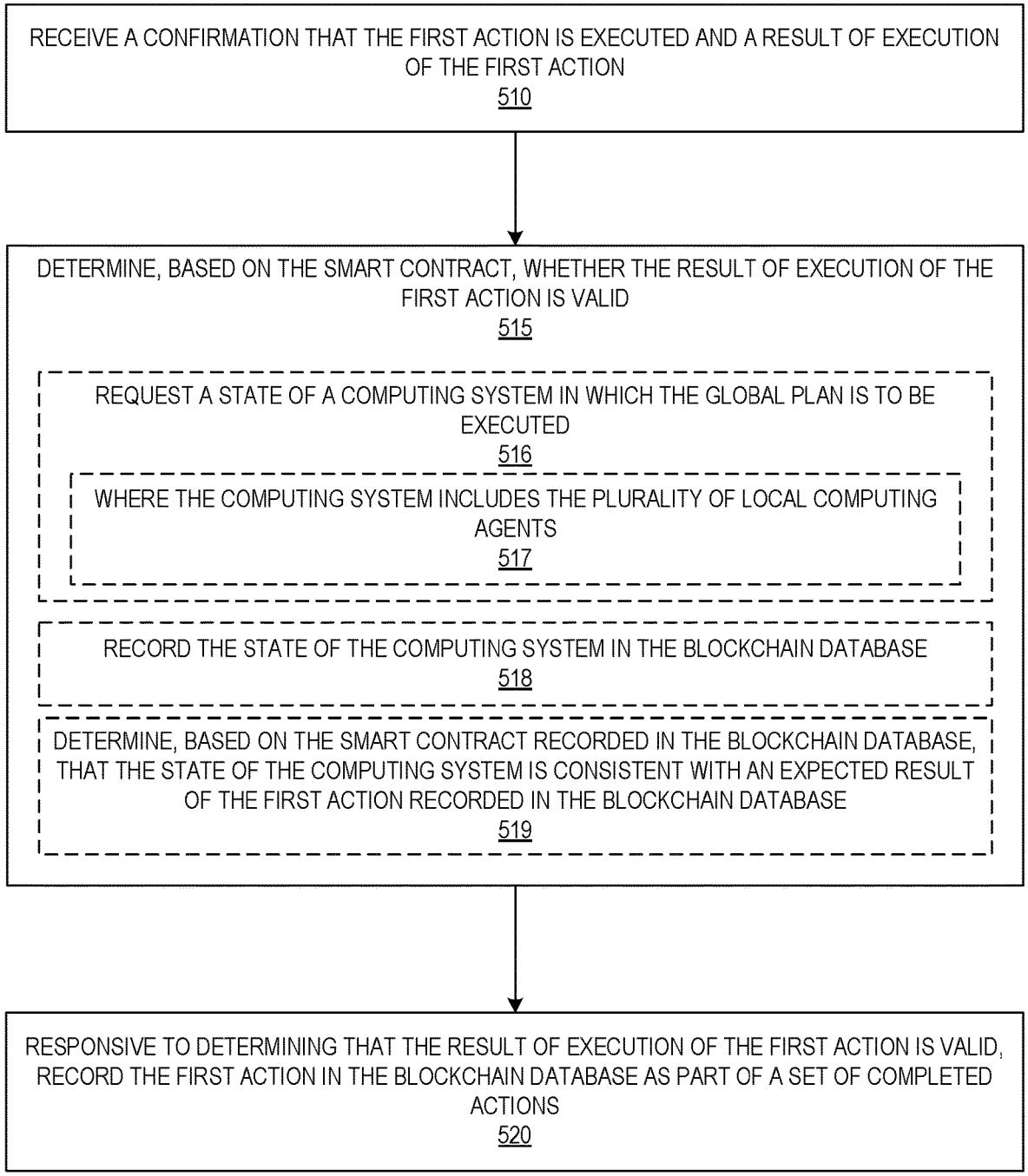
FIG. 5 illustrates a flow diagram of exemplary operations for recording an action as a completed action in the blockchain database, in accordance with some embodiments.

FIG. 5 illustrates a flow diagram of exemplary operations for recording an action as a completed action in the blockchain database, in accordance with some embodiments. At operation 510, a confirmation that the first action is executed and a result of execution of the first action are received.

At operation 515, a determination is performed based on the smart contract, of whether the result of execution of the first action is valid. In some embodiments, the determination of whether the result of execution of the first action is valid includes operations 516-519. At operation 516, the state of a computing system (e.g., system 100) in which the global plan is to be executed is requested. The state of the system may include the state of the local computing agents that are part of the system. In some embodiments, the state of the system is obtained by transmitting a request to the system state determiner 120 as described with reference to FIG. 3A-F. At operation 518, the state of the computing system is recorded in the blockchain database. Flow then moves to operation 519 at which a determination is performed based on the smart contract recorded in the blockchain database, that the state of the computing system is consistent with an expected result of the first action recorded in the blockchain database. The expected result of the first action is recorded in the blockchain database as part as the code of the smart contract for the first action associated with the first local computing agent that is to execute the first action. Flow then moves to operation 520, at which responsive to determining that the result of execution of the first action is valid, the first action is recorded in the blockchain database as part of a set of completed actions.

In some embodiments, when the second action needs the first action to be executed, following the recording of the first action in the blockchain database, the second local computing agent is caused to determine that the second action can be executed, and in response to determining that the second action can be executed, the second local computing agent executes the second action.

The proposed solution has several advantages when compared to prior distributed computing systems. The solution ensures that all computing agents have the same view of the plans executed by all the computing agents. There is a consensus between the different computing agents on the executed/completed actions. The recordation of the actions in association with the identification of the local computing agent that is to execute the action, the preconditions that need to be satisfied prior to execution of the agent, the previous actions that need to be executed prior to execution of the action, the action's expected result and agent/action that is expected to receive the result of the action enables to trust the execution of the actions. The solution also ensures that no single computing agent is a point of failure for the system as the blockchain database storing the smart contract is replicated on each local computing agent acting as a blockchain node. Further, the solution ensures that no single agent works with a mal-intention as it will automatically have to pay the price for doing so by getting malicious requests for actions invalidated. Thus, the solution presented herein allows for collaboration between computing agents in an untrusted distributed computing environment.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 100 can be implemented on one or more network devices coupled in a network. For example, each of the plan determinator 102, which includes application(s) 104 and planner 106, plan executor(s) 116, smart contract generator 110, local computing agents 114A-N, and system state determiner 120 can be implemented on one ND or distributed over multiple NDs. While each one of the blockchain database 113A-N is illustrated as a single entity, one or ordinary skill in the art would understand that the blockchain database is a permissioned, distributed ledger that is implemented on multiple network devices such that a copy of the blockchain database is replicated in each data center acting as a blockchain node.

Figure 6:
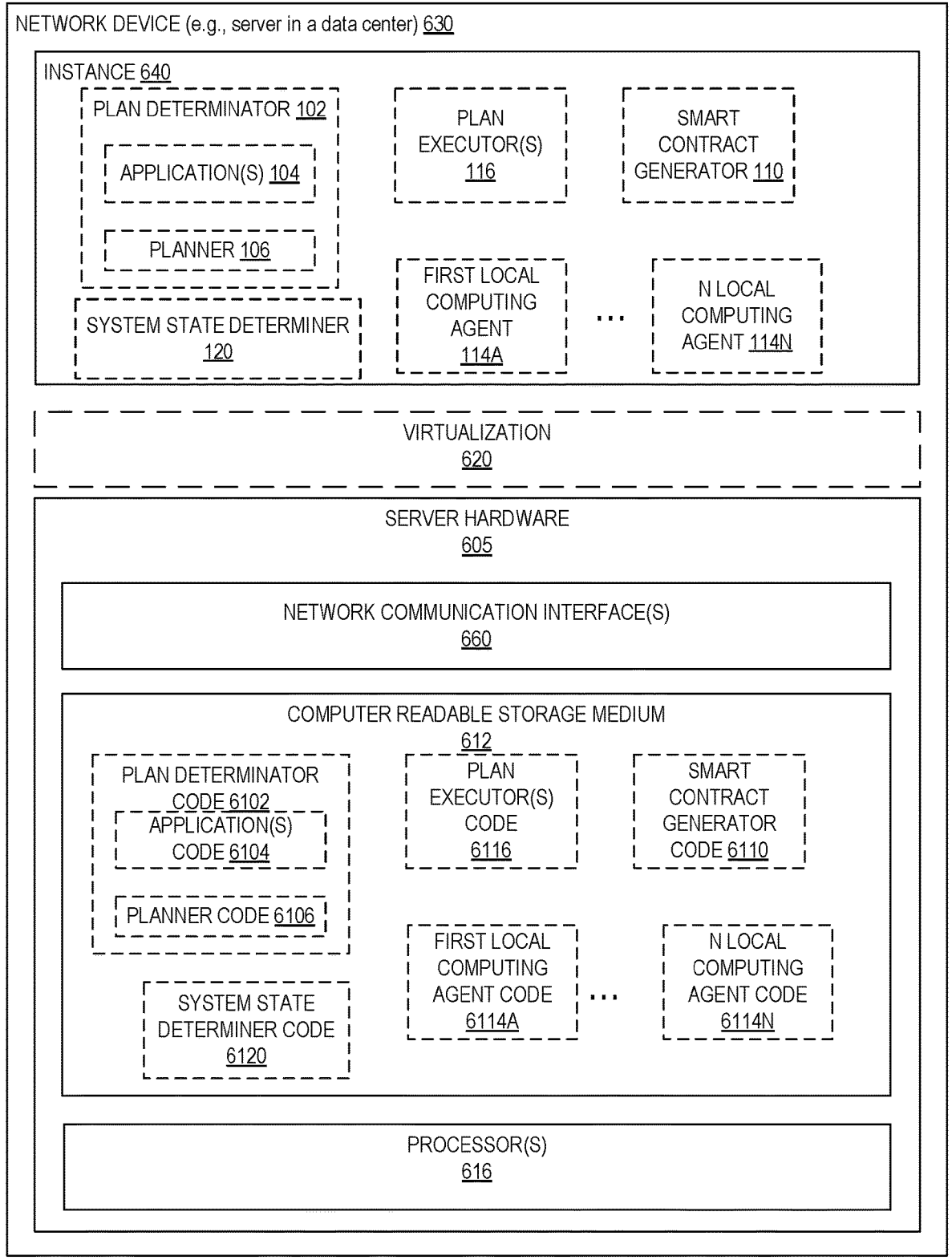
FIG. 6 illustrates a block diagram for a network device that can be used for implementing one or more of the components described herein, in accordance with some embodiments.

FIG. 6 illustrates a block diagram for a network device that can be used for implementing one or more of the components described herein, in accordance with some embodiments. The network device 630 may be a web or cloud server, or a cluster of servers, running on server hardware. According to one embodiment, the network device is a server device which includes server hardware 605. Server hardware 605 includes one or more processors 616, network communication interfaces 660 coupled with a computer readable storage medium 612. The computer readable storage medium 612 may include one or more of plan determinator code 6102, which includes application(s) code 6104 and planner code 6106, plan executor(s) code 6116, smart contract generator code 6110, local computing agent code (6114A-N), and system state determiner code 6120. In some embodiments, the various codes stored in the computer readable storage medium 612 can be stored in separate readable storage media elements such that the different component are physically separate from one another.

While one embodiment does not implement virtualization, alternative embodiments may use different forms of virtualization—represented by a virtualization layer 1120. In these embodiments, the instance 1140 and the hardware that executes it form a virtual server which is a software instance of the modules stored on the computer readable storage medium 1114.

Each of plan determinator code 6102, which includes application(s) code 6104 and planner code 6106, plan executor(s) code 6116, smart contract generator code 6110, local computing agent code (6114A-N), and system state determiner code 6120 includes instructions which when executed by the server hardware 605 causes the instance 640 to respectively implement a plan determinator 102, which includes application(s) 104 and planner 106, plan executor(s) 116, smart contract generator 110, local computing agents 114A-N, and system state determiner 120. While the network device is illustrated as including an instance of each of the plan determinator 102, which includes application(s) 104 and planner 106, plan executor(s) 116, smart contract generator 110, local computing agents 114A-N, and system state determiner 120, in some embodiments, a server may include a subset of these components. In other embodiments, two or more of these instances can be executed on the same server.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method of enabling coordinated executions of distributed computing actions in a distributed computing system with a plurality of local computing agents that are untrusted, the method comprising:
   recording, in a blockchain database, a smart contract including a plurality of plans that form a global plan, each one of the plurality of plans including a set of one or more actions to be executed by a respective one of the plurality of local computing agents;
   the global plan defines a distributed computing plan, each untrusted local computing agent represented by a blockchain node in the blockchain database, each action comprising a computing action of the distributed computing plan assigned to a respective blockchain node, and the smart contract manages collaboration between the untrusted local computing agents in performing the distributed computing plan;
   requesting execution of a first action of a first set of actions forming a first one of the plurality of plans by a first of the plurality of local computing agents;
   requesting execution of a second action of a second set of actions forming a second one of the plurality of plans to be executed by a second of the plurality of local computing agents;
   determining, based on the smart contract, whether the first action can be executed by the first of the plurality of local computing agents, the determining, based on the smart contract, whether the first action can be executed by the first of the plurality of local computing agents including determining, based on the smart contract, whether a first set of one or more preconditions expected to be satisfied prior to the execution of the first action is satisfied, the first set of one or more preconditions including a state of the distributed computing system being operated through the actions of the first of the plurality of local computing agents;

determining, based on the smart contract, whether the second action can be executed by the second of the plurality of local computing agents, the determining, based on the smart contract, whether the second action can be executed by the second of the plurality of local computing agents including determining, based on the smart contract, whether a second set of one or more preconditions expected to be satisfied prior to the execution of the second action is satisfied, the second set of one or more preconditions including the state of the distributed computing system being operated through the actions of the second of the plurality of local computing agents;

responsive to determining that the first action can be executed, causing the first of the plurality of local computing agents to execute the first action; and responsive to determining that the second action cannot be executed, causing the second of the plurality of local computing agents to not execute the second action;

receiving a confirmation that the first action is executed and a result of execution of the first action;

determining, based on the smart contract, whether the result of execution of the first action is valid;

responsive to determining that the result of execution of the first action is valid, recording the first action in the blockchain database as part of a set of completed actions;

following the recording of the first action in the blockchain database, causing the second of the plurality of local computing agents to:

determine that the second action can be executed, and responsive to determining that the second action can be executed, causing the second of the plurality of local computing agents to execute the second action.

2. The method of claim 1, wherein the determining whether the result of execution of the first action is valid includes:

requesting the state of the distributed computing system in which the global plan is to be executed;

recording the state of the distributed computing system in the blockchain database; and determining, based on the smart contract recorded in the blockchain database, that the state of the distributed computing system is consistent with an expected result of the first action recorded in the blockchain database.

3. The method of claim 1, wherein the determining, based on the smart contract, whether the first action can be executed by the first of the plurality of local computing agents includes:

determining, based on the smart contract, whether an action expected to be executed prior to the first action is included in a set of completed actions stored in the blockchain database, wherein the set of completed actions includes one or more actions already executed by one or more of the plurality of local computing agents; and wherein determining, based on the smart contract, whether the second action can be executed by the second of the plurality of local computing agents includes:

determining, based on the smart contract, whether an action expected to be executed prior to the second action is included in the set of completed actions stored in the blockchain database.

4. The method of claim 3, wherein the first action is expected to be executed prior to the second action and the determining that the second action cannot be executed includes determining that the first action is not included in the set of completed actions stored in the blockchain database.

5. The method of claim 1, wherein the execution of each one of the plurality of plans is to be performed in combination with execution of one or more actions from one or more other plans from the plurality of plans.

6. The method of claim 1, further comprising:

generating from the global plan the plurality of plans, wherein each one of the plurality of plans is to be executed by a respective one of the plurality of local computing agents.

7. A system for enabling coordinated executions of distributed computing actions in a distributed computing system with a plurality of local computing agents that are untrusted, the system comprising:

a network device operative to record, in a blockchain database, a smart contract including a plurality of plans that form a global plan, each one of the plurality of plans including a set of one or more actions to be executed by a respective one of the plurality of local computing agents;

the global plan defines a distributed computing plan, each untrusted local computing agent represented by a blockchain node in the blockchain database, each action comprising a computing action of the distributed computing plan assigned to a respective blockchain node, and the smart contract manages collaboration between the untrusted local computing agents in performing the distributed computing plan;

a first of the plurality of local computing agents operative to:

request execution of a first action from a first set of actions forming a first one of the plurality of plans to be executed by the first of the plurality of local computing agents, determine, based on the smart contract, whether the first action can be executed by the first of the plurality of local computing agents, the determination, based on the smart contract, whether the first action can be executed by the first of the plurality of local computing agents including determining, based on the smart contract, whether a first set of one or more preconditions expected to be satisfied prior to the execution of the first action is satisfied, the first set of one or more preconditions including a state of the distributed computing system being operated through the actions of the first of the plurality of local computing agents, and responsive to determining that the first action can be executed, cause the first of the plurality of local computing agents to execute the first action; and a second of the plurality of local computing agents operative to:

request execution of a second action from a second set of actions forming a second one of the plurality of plans to be executed by the second of the plurality of local computing agents, determine, based on the smart contract, whether the second action can be executed by the second of the plurality of local computing agents, the determination, based on the smart contract, whether the second action can be executed by the second of the plurality of local computing agents including determining, based on the smart contract, whether a second set of one or more preconditions expected to be satisfied prior to the execution of the second action is satisfied, the second set of one or more preconditions including the state of the distributed computing system being operated through the actions of the second of the plurality of local computing agents, and responsive to determining that the second action can be executed, cause the second of the plurality of local computing agents to not execute the second action;

the first of the plurality of local computing agents further operative to:

receive a confirmation that the first action is executed and a result of execution of the first action;

determine, based on the smart contract, whether the result of execution of the first action is valid; and responsive to determining that the result of execution of the first action is valid, record the first action in the blockchain database as part of a set of completed actions;

following to record the first action in the blockchain database, cause the second of the plurality of local computing agents to:

determine that the second action can be executed, and responsive to determining that the second action can be executed, causing the second of the plurality of local computing agents to execute the second action.

8. The system of claim 7, wherein to determine, based on the smart contract, whether the result of execution of the first action is valid includes to:

request the state of the distributed computing system in which the global plan is to be executed;

record the state of the distributed computing system in the blockchain database; and determine, based on the smart contract recorded in the blockchain database, that the state of the distributed computing system is consistent with an expected result of the first action recorded in the blockchain database.

9. The system of claim 7, wherein to determine, based on the smart contract, whether the first action can be executed by the first of the plurality of local computing agents includes to:

determine, based on the smart contract, whether an action expected to be executed prior to the first action is included in a set of completed actions stored in the blockchain database, wherein the set of completed actions includes one or more actions already executed by one or more of the plurality of local computing agents; and wherein to determine, based on the smart contract, whether the second action can be executed by the second of the plurality of local computing agents includes to:

determine, based on the smart contract, whether an action expected to be executed prior to the second action is included in the set of completed actions stored in the blockchain database.

10. The system of claim 9, wherein the first action is expected to be executed prior to the second action and to determine that the second action cannot be executed includes to determine that the first action is not included in the set of completed actions stored in the blockchain database.

11. The system of claim 7, wherein the execution of each one of the plurality of plans is to be performed in combination with execution of one or more actions from one or more other plans from the plurality of plans.

12. The system of claim 7, wherein the system is further to:

generate from the global plan the plurality of plans, wherein each one of the plurality of plans is to be executed by a respective one of the plurality of local computing agents.

13. A non-transitory computer readable storage medium that stores instructions which when executed by one or more processors cause the one or more processors to perform operations for enabling coordinated executions of distributed computing actions in a distributed computing system with a plurality of local computing agents that are untrusted, the operations comprising:

recording, in a blockchain database, a smart contract including a plurality of plans that form a global plan, each one of the plurality of plans including a set of one or more actions to be executed by a respective one of the plurality of local computing agents;

the global plan defines a distributed computing plan, each untrusted local computing agent represented by a blockchain node in the blockchain database, each action comprising a computing action of the distributed computing plan assigned to a respective blockchain node, and the smart contract manages collaboration between the untrusted local computing agents in performing the distributed computing plan;

requesting execution of a first action of a first set of actions forming a first one of the plurality of plans by a first of the plurality of local computing agents;

requesting execution of a second action of a second set of actions forming a second one of the plurality of plans to be executed by a second of the plurality of local computing agents;

determining, based on the smart contract, whether the first action can be executed by the first of the plurality of local computing agents, the determining, based on the smart contract, whether the first action can be executed by the first of the plurality of local computing agents including determining, based on the smart contract, whether a first set of one or more preconditions expected to be satisfied prior to the execution of the first action is satisfied, the first set of one or more preconditions including a state of the distributed computing system being operated through the actions of the first of the plurality of local computing agents;

determining, based on the smart contract, whether the second action can be executed by the second of the plurality of local computing agents, the determining, based on the smart contract, whether the second action can be executed by the second of the plurality of local computing agents including determining, based on the smart contract, whether a second set of one or more preconditions expected to be satisfied prior to the execution of the second action is satisfied, the second set of one or more preconditions including the state of the distributed computing system being operated through the actions of the second of the plurality of local computing agents;

responsive to determining that the first action can be executed, causing the first of the plurality of local computing agents to execute the first action; and responsive to determining that the second action cannot be executed, causing the second of the plurality of local computing agents to not execute the second action;

receiving a confirmation that the first action is executed and a result of execution of the first action; determining, based on the smart contract, whether the result of execution of the first action is valid; and responsive to determining that the result of execution of the first action is valid, recording the first action in the blockchain database as part of a set of completed actions;

following the recording of the first action in the blockchain database, causing the second of the plurality of local computing agents to:

determine that the second action can be executed, and responsive to determining that the second action can be executed, causing the second of the plurality of local computing agents to execute the second action.

14. The non-transitory computer readable storage medium of claim 13, wherein the determining whether the result of execution of the first action is valid includes:

requesting the state of the distributed computing system in which the global plan is to be executed;

recording the state of the distributed computing system in the blockchain database; and determining, based on the smart contract recorded in the blockchain database, that the state of the distributed computing system is consistent with an expected result of the first action recorded in the blockchain database.

15. The non-transitory computer readable storage medium of claim 13, wherein the determining, based on the smart contract, whether the first action can be executed by the first of the plurality of local computing agents includes:

determining, based on the smart contract, whether an action expected to be executed prior to the first action is included in a set of completed actions stored in the blockchain database, wherein the set of completed actions includes one or more actions already executed by one or more of the plurality of local computing agents; and wherein the determining, based on the smart contract, whether the second action can be executed by the second of the plurality of local computing agents includes:

determining, based on the smart contract, whether an action expected to be executed prior to the second action is included in the set of completed actions stored in the blockchain database.

16. The non-transitory computer readable storage medium of claim 15, wherein the first action is expected to be executed prior to the second action and the determining that the second action cannot be executed includes determining that the first action is not included in the set of completed actions stored in the blockchain database.

17. The non-transitory computer readable storage medium of claim 13, wherein the execution of each one of the plurality of plans is to be performed in combination with execution of one or more actions from one or more other plans from the plurality of plans.

18. The non-transitory computer readable storage medium of claim 13, wherein the operations further comprise:

generating from the global plan the plurality of plans, wherein each one of the plurality of plans is to be executed by a respective one of the plurality of local computing agents.

* * * * *